Figure 1:
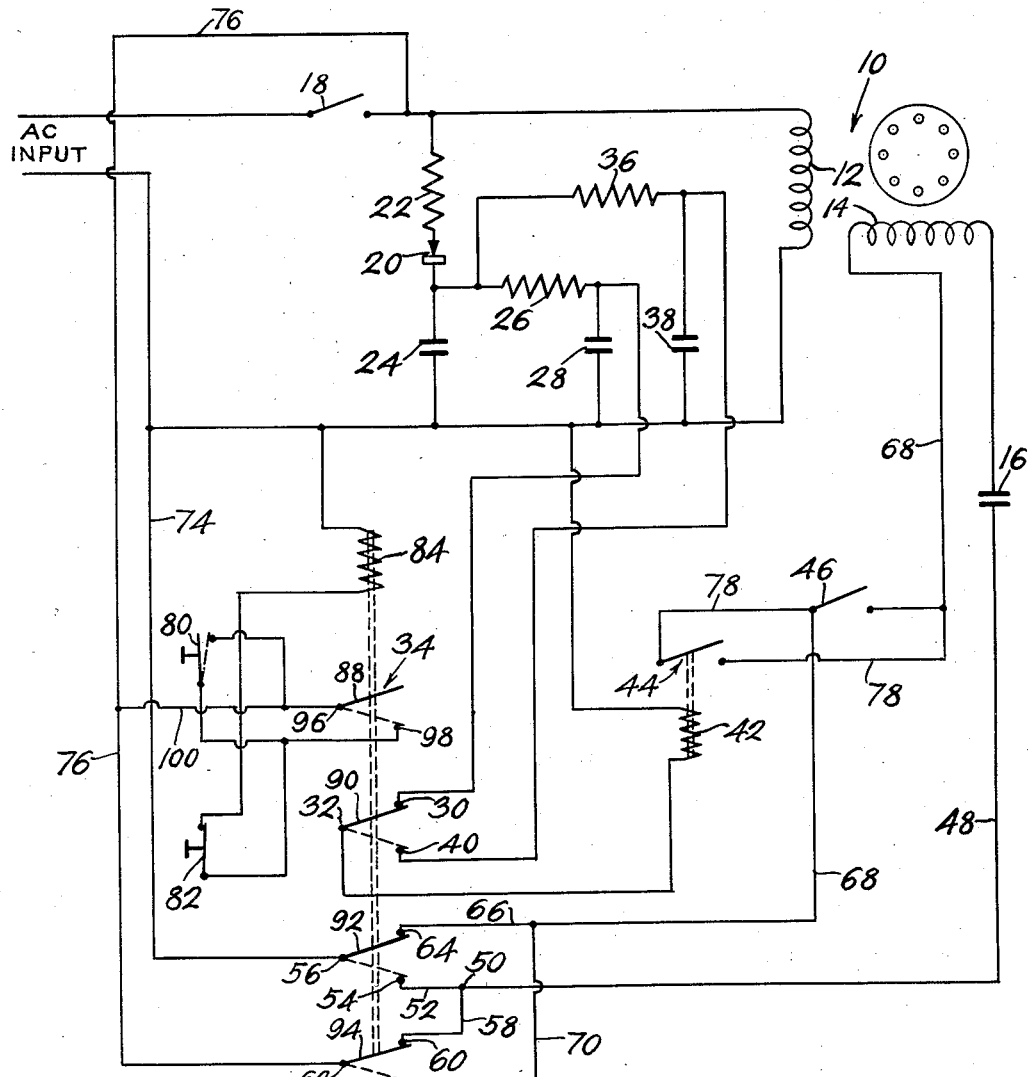

Dec. 2, 1958  E. P. MEYER  2,863,109

MOTOR REVERSING CIRCUITS

Filed Jan. 17, 1957

INVENTOR.
EDWARD P. MEYER
BY
ATTORNEY

United States Patent Office 2,863,109
Patented Dec. 2, 1958

2,863,109

MOTOR REVERSING CIRCUITS

Edward P. Meyer, Boulder, Colo.

Application January 17, 1957, Serial No. 634,766

7 Claims. (Cl. 318—207)

This invention relates to motor reversing circuits and, more particularly, to a circuit for accomplishing the instantaneous reversal of single-phase capacitor or split-phase motors.

In many instances, especially in the home workshop, three-phase current is not available and the hobbyist or small shop operator must use single-phase motors as the power supply for his shop equipment. The occasion frequently arises, however, where the single-phase motors do not provide the versatility of three-phase units; hence, the user is somewhat limited in the nature of the work that can be performed on his equipment.

One of the most critical limitations of single-phase equipment when compared with three-phase units is that, as yet, no practical and inexpensive way has been found to bring about instantaneous reversal of the single-phase motors. In a great many common shop operations it would be a considerable improvement to provide a simple control that could be used to effect reversal of a single-phase motor without waiting for it to slow down and stop before being started again in the opposite direction. Such a device would be extremely useful on lathes, drill presses, boring mills, tapping machines and other common shop equipment wherein it is frequently necessary to accurately control the depth or length of a cut, hole, thread or the like.

The prior art circuits for reversing single-phase capacitor and split-phase motors have, almost without exception, operated on a principle that required the current to be shut off so that the armature could come to a complete stop before the starting winding could be energized to start the armature rotating in the opposite direction. Obviously, such a system is quite ineffective where any high degree of accuracy is required in controlling a machine operation, as it is virtually impossible to determine how far the drill or other operating tool will travel on the workpiece before the armature stops rotating.

It is, therefore, the principal object of the present invention to provide a novel electrical circuit for bringing about the instantaneous reversal of a single-phase capacitor or split-phase motor.

Another object of the invention is to provide a motor reversing device which is useful to effect accurate control over the movements of conventional single-phase shop equipment.

Further objects of the invention are to provide a motor reversing unit which is simple, inexpensive, compact and adapted for use with any of the conventional single-phase capacitor or split-phase motors.

Figure 2:
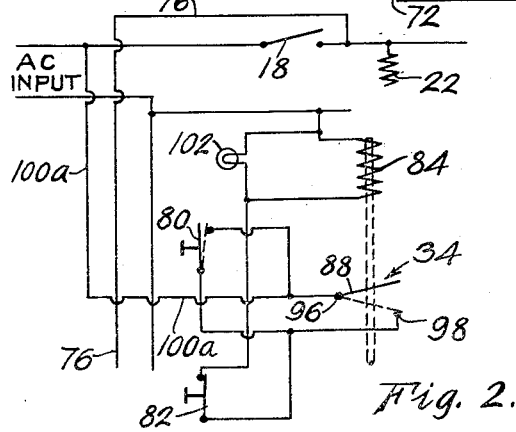

Other objects will be in part apparent and in part pointed out specifically hereinafter in connection with the description of the drawing which follows, in which:

Figure 1 is a circuit diagram showing the motor reversing device that forms the subject matter of the invention; and Figure 2 is a fragmentary view showing a slight modification of the basic circuit wherein the main on-off switch is connected into the circuit at a different point.

Referring now to Figure 1 of the drawing, reference numeral 10 represents, in a general way, a single-phase capacitor motor having a running winding 12, a starting winding 14 and condenser 16 in series with the starting winding. Condenser 16, of course, is not used in a split-phase motor, the operation of which can also be controlled with the motor reversing circuit of the instant invention with equally good results. An A. C. input is impressed across the running winding 12 of the motor, as indicated. A main on-off switch 18 is connected into the A. C. input lead to the running winding of the motor to control energization thereof. A single-phase rectifier 20 (either half-wave or full-wave) is connected across the A. C. input leads between the on-off switch 18 and the running winding 12. Numeral 22 represents a resistance sized to limit the peak rectifier current and filter capacitor 24 smooths the D. C. output of the rectifier. Resistor 26 and capacitor 28 are connected in series in a branch of the D. C. circuit extending from between the rectifier 20 and the filter capacitor 24 to the normally-closed contact 30 of pole 32 included in an A. C. relay-operated four-pole double-throw spring-biased switch indicated in a general way by numeral 34. A second parallel branch of the D. C. circuit includes resistor 36 and capacitor 38 connected in series and extends from the rectifier to the normally-open contact 40 of pole 32 in switch 34.

Pole 32 of switch 34 is connected to coil 42 of a D. C. relay-operated spring-biased normally-open single-pole single-throw switch indicated generally by numeral 44. The other side of coil 42 is connected to the return lead of the A. C. input, as shown.

The ends of the starting winding 14 of the motor are connected across the A. C. input in the conventional manner to accomplish energization thereof. Also, the starting winding circuit includes switch 46 which is usually of the centrifugal type to open the circuit and cut out the starting winding after the motor is started; however, thermally-operated switches and certain other types can be substituted for a centrifugal switch to de-energize the starting winding in accordance with conventional practice. Switch 46 will henceforth be described as though it were a centrifugal switch as this is the most common type.

Lead 48 from one side of the starting winding 14 is branched at 50. One of the branches 52 of lead 48 is attached to the normally-open contact 54 of pole 56 in switch 34; whereas, the other branch 58 is connected to the normally-closed contact 60 of pole 62 in switch 34. The normally-closed contact 64 of pole 56 in switch 34 is connected to branch 66 in lead 68 attached to the other side of the starting winding. The other branch 70 of lead 68 is connected to the normally-open contact 72 of pole 62. Leads 74 and 76 connect poles 56 and 62, respectively, across the A. C. input.

It is to be noted that lead 68 in the starting winding circuit contains switch 46 and also a by-pass lead 78 across switch 46. The by-pass lead contains switch 44 that is used to close the starting winding circuit upon energization of coil 42 even though switch 46 is open.

The actual reversal of the direction of rotation of the motor is brought about by actuation of spring-biased normally-open switch 80 which will henceforth be denominated the "reverse switch" and spring-biased normally-closed switch 82 which will be referred to as the "forward switch." Switches 80 and 82 can be micro-switches or some other type of precision snap-action switch positioned for automatic actuation by a machine tool carriage or spindle as it traverses back and forth during a given machine operation. The control circuit includes coil 84 of the four-pole double-throw switch 34, forward switch 82 and reverse switch 80 connected in series across the A. C. input. This control circuit is broken and, therefore, normally de-energized by reason of normally-open reverse switch 80. When, however, switch 80 is momentarily closed, the control circuit is complete and coil 84 is energized to simultaneously move the switch arms 88, 90, 92 and 94 of the switch 34 from the normally closed contacts to the normally-open contacts. Switch arm 88 is connected to pole 96 of switch 34 which is normally open; however, the switch arm 88 moves to closed position against normally-open contact 98 upon energization of the relay coil 84. Pole 96 and normally-open contact 98 are connected across reverse switch 80 and, therefore, switch arm 88 functions to maintain the control circuit closed after switch 80 is momentarily energized even though it is again opened, as said switch arm forms a parallel connection by-passing switch 80.

Now, to begin operation of the motor, on-off switch 18 is closed to energize the running winding 12. Switch 46 is, of course, closed when the motor starts and the starting winding 14 is energized through the completed circuit formed by lead 76, pole 62, switch arm 94, normally-closed contact 60, lead 58, lead 48, capacitor 16, starting winding 14, lead 68, including switch 46, lead 66, normally-closed contact 64, switch arm 92, pole 56, and lead 74. After the motor has started, switch 46 opens and breaks the circuit through the starting winding. Reversal of the motor is accomplished by momentarily closing reverse switch 80 which completes the control circuit and energizes the relay coil 84. As soon as this coil is energized, switch arm 88 moves against the normally-closed contact 98 thus maintaining the control circuit and relay coil energized even though reverse switch 80 is released to open position. At the same time, switch arm 90 moves from normally-closed contact 30 to normally-open contact 40, switch arm 92 moves from normally-closed contact 64 to normally-open contact 54, and switch arm 94 moves from normally-closed contact 60 to normally-open contact 72. The foregoing condition of switch 34 is represented by dotted lines. When switch arm 90 moves against contact 40, condenser 38 discharges through D. C. relay coil 42 which causes switch 44 to close, switch 46 being held open by the centrifugal mechanism while the motor is operating. Closing of switch 44, however, by-passes the current across the open switch 46 and energizes the starting winding circuit. At this point it should be noted that operation of switch 34 has also moved switch arms 92 and 94 from contacts 64 and 60 to contacts 54 and 72, respectively, thus reversing the direction of current flow through the starting winding 14 in relation to the running winding 12 which, of course, causes the armature (not shown) to stop almost instantaneously and change its direction of rotation. Switch 44 is spring-biased to open position and needs to stay closed only long enough to permit centrifugal switch 46 to close as the armature slows down. The current being supplied to coil 42 will quickly drop below the minimum required to hold switch 44 closed against the action of the spring when condenser 38 discharges; however, the time constant of resistor 36 and condenser 38 along with the characteristics of the D. C. relay determine the time delay which can easily be arranged to give switch 46 time to close before switch 44 opens.

Operation of switch 34 and the accompanying shift of switch arm 90 away from normally-closed contact 30 opens the other branch of the D. C. circuit and permits capacitor 28 to charge through resistance 26. Note that the D. C. circuit through resistance 36, capacitor 38 and relay coil 42 is still closed even though switch 44 has returned to its normally-open position. It is, therefore, important to balance the values of resistor 36 and the resistance of coil 42 so that the voltage drop across the coil is too small to maintain switch 44 closed after the condenser 38 is discharged. Approximately the same balance is maintained between resistor 26 and coil 42 in the other branch of the D. C. circuit.

As has been mentioned, the values of the capacitors 28 and 38 should be large enough so that the relay 44 remains closed long enough for the speed of the motor to decrease to a point where the centrifugal switch 46 will close. Also it should be small enough so that relay 44 opens before the motor regains enough speed in the opposite direction to reopen the centrifugal switch 46. The last requirement is not absolute but produces quieter operation of the motor since most motors are noisy when operating at full speed on both windings. The load on the motor may also require some adjustment of this time delay. The delay time depends principally upon three factors, namely: the voltage at which the relay 44 opens, the resistance of the coil 42 and the value of the capacitor 28 or 38.

Neglecting the small effects of the coil inductance and the charging resistor 26 or 36, the voltage on the coil will decrease according to a logarithmic curve calculated in accordance with the following exponential equation:

$$E_{coil} = E_{starting} e^{-\frac{t}{RC}}$$

where (R) is the resistance of the coil and (C) is the size of the capacitor. The characteristics of the logarithmic curve will, of course, depend upon the values of (R) and (C). When the voltage drops below the drop-out or opening voltage of the relay, the relay will open.

The charging resistor 26 or 36 should be large enough to limit the current and voltage drop across the relay coil, after the capacitor has discharged, to a value below that at which it drops out or opens, thus:

$$E_{coil} = E_{input}\left(\frac{R_c}{R + R_c}\right)$$

where (R) is the resistance of resistor 26 or 36 and ($R_c$) is the resistance of the coil.

The other limit on the value of this resistor is that it be small enough so that the charging time for the capacitor is not longer than the desired time between motor direction changes. The voltage on the capacitor rises after opening of contacts 30 or 40, thus:

$$E_{cap} = E_{input}\left(1 - e^{-\frac{t}{RC}}\right)$$

and $E_{cap}$ should be about 95% or more of $E_{input}$ to properly operate the relay and delay circuit. Here R and C refer to values of the charging resistor 26 or 36 and capacitor 28 or 38, respectively.

When it is again necessary to change the direction of rotation of the motor from reverse to forward, forward switch 82 is actuated momentarily to break the control circuit and de-energize A. C. relay coil 84 thereby returning the switch arms from the normally-open contacts to the normally-closed contacts, as indicated by full lines. The shift of switch arm 88 to its spring-biased open position maintains the control circuit in broken condition even though switch 82 is instantly released to closed position. At the same time switch arms 92 and 94 are returned to normally-closed contacts 64 and 60, respectively, thus again shifting the direction of current flow through the starting winding back to that which it was originally. Switch arm 90 now acts to break the D. C. circuit through resistor 36 and capacitor 38 while closing the other D. C. branch through resistor 26 and capacitor 28 which has become charged. Capacitor 28 discharges through relay 42 which closes switch 44 and completes the starting winding circuit in the manner already described in connection with the other branch of the D. C. circuit. Condenser 38 in the open branch becomes charged preparatory to another reverse operation.

Now, from the position of the on-off switch 18 in the circuit, as illustrated in Figure 1, it will be apparent that this switch must be closed before the direction of rotation of the motor can be changed as it is placed in the circuit ahead of lead 76 that forms part of the control circuit. It the modification of Figure 2, however, lead 100 which extends between switch contact 96 and lead 76 in the Figure 1 circuit is changed to by-pass lead 76 and is connected directly into the main A. C. input line ahead of on-off switch 18 as indicated by 100a. In the modified circuit, the motor can be set for reverse operation before it is started by closing normally-open switch 80 while switch 18 is in the "off" position. Thus, when switch 18 is turned on or closed, the motor will begin rotation in the reverse direction. If desired, a pilot lamp 102 can be connected across relay coil 84, as shown in Figure 2, to indicate when the circuit is set for reverse operation. With the circuit energized, the lamp will light due to the voltage impressed on relay coil 84.

Having thus described the several useful and novel features of the motor reversing circuits illustrated in the accompanying drawing, it will be seen that the several objects for which it was designed have been achieved. I realize, however, that certain changes and modifications in the basic circuit may be made by those skilled in the art which fall within the broad teaching hereof; hence, it is my intention that the scope of protection afforded herein shall be limited only in-so-far as said limitations are expressly set forth in the appended claims.

What is claimed is:

1. An electrical circuit for instantaneously reversing the direction of rotation of a single phase alternating current motor of the type having a running winding and a starting winding adapted to be connected in parallel across an alternating current source and a speed responsive switch in the starting circuit operative to de-energize the starting winding after the motor has started comprising: a relay having a normally open contact connected across said speed responsive switch, a pair of condensers, means for connecting said condensers in parallel across the output of a rectifier circuit energized by said alternating current source whereby said condensers are charged by said rectifier circuit, a reversing switch connected into said starting winding circuit to effect a reversal of the direction of current flow therethrough, and means including switch means operated simultaneously with said reversing switch for selectively connecting said condensers across said relay whereby the selected condenser will discharge through said relay and momentarily close said normally open contact thereof to immediately energize said starting winding upon operation of said reversing switch regardless of the position of the speed responsive switch.

2. An electrical circuit in accordance with claim 1 wherein the charging circuit for said condensers includes a resistance in series with the condenser inputs of a value in relation to the resistance of said relay to limit the current flow through said relay to a value below that required to close said normally open contact thereof after discharge of the selected condenser.

3. An electrical circuit in accordance with claim 1 including a condenser in series with the starting winding adapting the circuit for use with a motor of the capacitor type.

4. An electrical circuit in accordance with claim 2 wherein the value of each condenser is chosen to provide an R–C time magnitude constant of sufficient length to retain the normally open contact closed when the selected condenser is discharged until the speed responsive switch is permitted to close.

5. An electrical circuit for instantaneously reversing the direction of rotation of a single phase alternating current motor of the type having a running winding and a starting winding adapted to be connected in parallel across an alternating current source and a speed responsive switch in the starting circuit operative to de-energize the starting winding after the motor has started comprising: a first relay having a normally open contact connected across said speed responsive switch, a pair of condensers, means for connecting said condensers in parallel across the output of a rectifier circuit energized by said alternating current source whereby said condensers are charged by said rectifier circuit, a second relay having a reversing switch actuated thereby and connected into said starting winding circuit to effect a reversal of the direction of current flow therethrough, and said second relay further including switch means operated simultaneously with said reversing switch for selectively connecting said condensers across said first relay whereby the selected condenser will discharge through said relay and momentarily close said normally open contact thereof to immediately energize said starting winding upon operation of said reversing switch regardless of the position of the speed responsive switch.

6. A circuit in accordance with claim 5 wherein the second relay includes a normally open contact connected in series with the relay across the alternating current source, normally open switch means connected across said normally open relay contact which on momentary closing energizes said relay and closes the normally open contact applying holding current to said relay and normally closed switch means connected in series with said relay and said normally open contacts which when opened de-energizes said relay returning the normally open contact to its original state.

7. A circuit in accordance with claim 6 including a master switch interposed between the normally open relay contact of said second relay and one side of the alternating current source.

References Cited in the file of this patent
UNITED STATES PATENTS

| | | |
|---|---|---|
| 2,473,244 | Fuller | June 14, 1949 |
| 2,509,898 | Wiseman | May 30, 1950 |